United States Patent
Bell

(12) United States Patent     (10) Patent No.: US 6,530,612 B2
(45) Date of Patent: Mar. 11, 2003

(54) IN-DASH COMPACT DISC RETRIEVER

(76) Inventor: Annette B. Bell, 4841 Anderson Ave., St. Louis, MO (US) 63115

( * ) Notice: Subject to any disclaimer, the term of this patent is extended or adjusted under 35 U.S.C. 154(b) by 0 days.

(21) Appl. No.: 09/859,934

(22) Filed: May 17, 2001

(65) Prior Publication Data

US 2002/0008394 A1 Jan. 24, 2002

Related U.S. Application Data

(60) Provisional application No. 60/205,362, filed on May 18, 2000.

(51) Int. Cl.⁷ ................................................ B25J 1/00
(52) U.S. Cl. .......................................... 294/26; 294/24
(58) Field of Search ............................ 294/1.1, 2, 3.6, 294/6, 15, 19.1, 24, 26, 27.1, 33, 25; 7/163, 164; 81/3.05, 3.48, 3.49; 362/100, 109, 119, 120, 253; 369/72

(56) References Cited

U.S. PATENT DOCUMENTS

| | | | | |
|---|---|---|---|---|
| 1,328,964 A | * | 1/1920 | Penn | 294/26 |
| 1,339,444 A | * | 5/1920 | Ferguson | 294/24 |
| 2,486,286 A | * | 10/1949 | Irving | 81/3.49 |
| 2,613,979 A | | 10/1952 | Stillabower | |
| 2,977,127 A | * | 3/1961 | Mertes | 369/72 |
| 3,282,589 A | | 11/1966 | Morrison | |
| 3,961,819 A | | 6/1976 | Yocum | |
| 4,174,130 A | * | 11/1979 | Mayfield | 294/25 |
| 4,242,928 A | * | 1/1981 | Haley et al. | 294/26 X |
| 4,414,736 A | | 11/1983 | Fieberg et al. | |
| 4,417,757 A | | 11/1983 | Morrison | |
| 4,653,038 A | * | 3/1987 | Boudreaux | 294/25 X |
| 4,964,663 A | | 10/1990 | Jermyn | |
| 4,986,586 A | | 1/1991 | Eilrich et al. | |
| 5,072,982 A | | 12/1991 | Boss | |
| 5,192,106 A | | 3/1993 | Kaufman | |
| 5,197,176 A | * | 3/1993 | Reese | 294/26 X |
| 5,347,439 A | * | 9/1994 | Warren | 294/24 X |
| 5,573,291 A | * | 11/1996 | Raupp et al. | 294/1.1 |
| 5,620,231 A | * | 4/1997 | Marker et al. | 294/1.1 X |
| 5,685,586 A | * | 11/1997 | Miller | 294/26 X |
| 5,713,618 A | | 2/1998 | Kocsis | |
| 6,119,326 A | * | 9/2000 | Szweda | 294/26 X |

OTHER PUBLICATIONS

IBM Technical Disclosure Bulletin, vol. 17, No. 8, Jan. 1975, "Retrieving Tool" by D.W. Burnham.*

* cited by examiner

*Primary Examiner*—Johnny D. Cherry
(74) *Attorney, Agent, or Firm*—Wheeler Law Offices, P.C.; Linda D. Wheeler, Esq.

(57) ABSTRACT

An in-dash compact disc retriever that is used to remove compact discs or digital video discs from compact disc or digital video disc players when they are stuck and cannot be ejected by normal means.

4 Claims, 3 Drawing Sheets

IN-DASH COMPACT DISC RETRIEVER

RELATED APPLICATIONS

This application claims the benefit of U.S. Provisional Patent Application No. 60/205,362 filed on May 18, 2000.

FIELD OF THE INVENTION

The present invention relates generally to accessories for compact disc players. More specifically, the present invention relates to a compact disc removal tool that removes compact discs from compact disc players and/or recorders when they will not eject by normal means.

BACKGROUND OF THE INVENTION

Modern hi-fidelity audio systems have made their way to the realm of automobile audio. In fact, it is not uncommon to find people that spend thousands of dollars to install the latest AM/FM receivers, compact disc (CD) players and changers, mini-disc systems, cassette players, power amplifiers, speakers and a variety of other components in their vehicles.

While the electronic portion of these devices are usually trouble free, the mechanical portion often suffers from glitches due to the somewhat more harsh atmosphere and temperature extremes encountered in a motor vehicle. One particularly affected device is the dash mounted compact disc player. Often, discs may become lodged or jammed inside the unit. The most common way to remove the disc in such an instance is to remove the entire dashboard, the unit and the faceplate. Such repairs may run into the hundreds of dollars.

Accordingly, a need exists for a means by which compact discs and/or digital video discs (DVDs) that have become jammed inside players can be removed with minimal effort and cost.

SUMMARY OF THE INVENTION

The present invention, the in-dash compact disc retriever, is an apparatus that is used to remove compact discs or digital video discs from compact disc or digital video disc players when they are stuck and cannot be ejected by normal means. The in-dash compact disc retriever is thin and flat and has a soft hook attached to one end for hooking onto the center aperture of a CD or DVD and causing the removal thereof from a CD or DVD player. It is preferred that the apparatus have increments on the body thereof as well as a small flashlight or pen light that will aid the user in finding the center aperture of a CD or DVD.

It is the primary object of the present invention to provide a device for removing a CD or DVD that is jammed and/or stuck in a CD or DVD player without damaging the CD or DVD or the CD or DVD player.

It is a further object of the present invention to provide a device for removing a CD or DVD that is jammed and/or stuck in a CD or DVD player without causing great expense and inconvenience.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
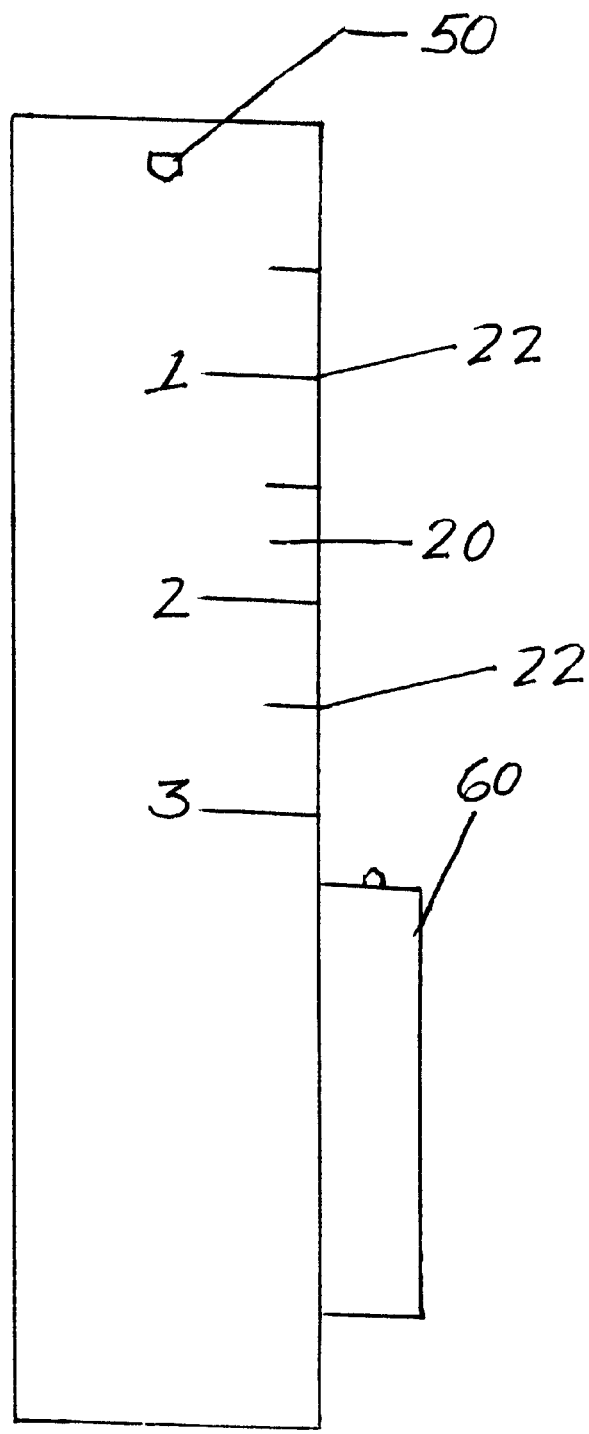
FIG. 1 is a front view of the In-Dash Compact Disc Retriever.
Figure 2:
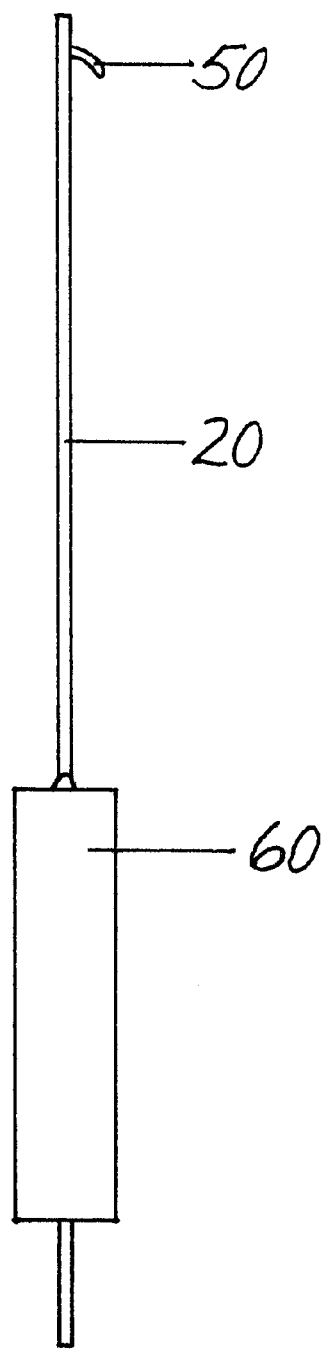
FIG. 2 is a side view of the In-Dash Compact Disc Retriever.

In the preferred embodiment, as seen in FIGS. 1 and 2, the In-Dash Compact Disc Retriever 10 has a thin flat body 20. In the preferred embodiment, the body 20 is not wider than the width of an opening 32 for a compact disc (CD) or digital video disc (DVD) 40 in a CD or DVD player 30; such a width is commonly known to those of ordinary skill in the art. Further, in the preferred embodiment, the body 20 is flat, not thicker than the height of an opening 32 for a CD or DVD 40 in a CD or DVD player 30 less the thickness of a CD or DVD; such a thickness is commonly known to one of ordinary skill in the art.

It is preferred that the body 20 is made out of a hard smooth plastic. One of ordinary skill in the art would recognize that other materials, including, but not limited to, wood, can be used to construct the body 20. It is also preferred that the body 20 be rectangular in shape, although it can be other shapes, including, but not limited to, oval.

In a preferred embodiment, the body 20 has ruler type incremental markings 22 on both sides thereof The incremental markings aid the user in finding the center aperture 42 of a compact disc or digital video disc 40 since the average distance between the edge of the CD or DVD 40 to the center aperture 42 is approximately two and one-eighth inches. Consequently, it is preferred that the ruler type incremental markings 22 each be one-eighth of an inch apart. One of ordinary skill in the art would recognize, however, that the body 20 need not have ruler type incremental markings 22 or could have incremental markings 22 on only one side thereof and would further recognize that when the body 20 does have ruler type incremental markings 22, said markings 22 can be in any number of increments. It is preferred, however, that said markings 22 not be further than one inch apart. In an alternative embodiment, the body 20 has only one predetermined mark thereupon that marks the average distance to the center aperture 42 of a CD or DVD 40 when said CD or DVD 40 is jammed in a CD or DVD player 30.

The length of the body 20 is such that it can be inserted into an opening 32 for a CD or DVD 40 in a CD or DVD player 30 and reach the center aperture 42 of the CD or DVD 40 and still be held by the hand of the user with no risk of losing the In-Dash Compact Disc Retriever 10 inside of the CD or DVD player 30; such a length is commonly known to those of ordinary skill in the art.

Figure 3:
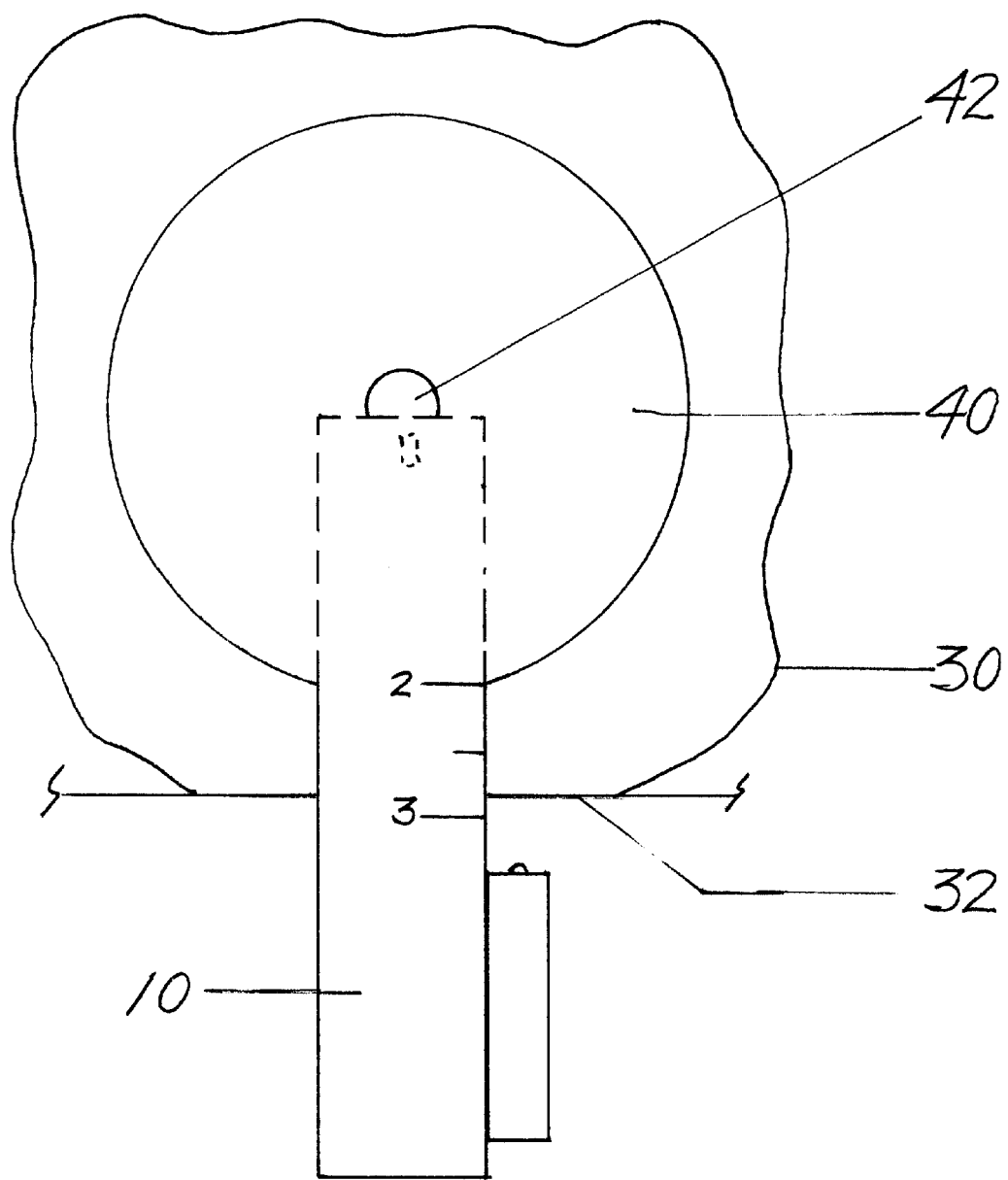
FIG. 3 is a top view of the In-Dash Compact Disc Retriever in use.

In the preferred embodiment, as seen in FIG. 1, at one end of the body 20, preferably centered width-wise on the body 20, is a hook 50. It is preferred that the hook 50 is made out of felt. One of ordinary skill in the art would readily recognize, however, that a number of different materials, including, but not limited to foam can be used instead of felt to make the hook. It is preferred, however, that the material be such that it will not injure the inside of the CD or DVD player 30 and will not scratch or otherwise injure the CD or DVD 40, but will be strong enough to pull the CD or DVD 40 free from the CD or DVD player 30. As seen in FIG. 3, in a preferred embodiment, the hook 50 is formed such that when the in-dash compact disc retriever 10 is manually inserted in the opening 32 for a CD or DVD 40 in a CD or DVD player 30, it will smoothly glide over the CD or DVD

40 without scratching said CD or DVD 40. The ruler type incremental markings 22, preferably begin at the hook 50. This allows the user to evaluate how far the hook 50 is in the CD or DVD player 30. When the increments state two and one-eighth inches plus the estimated distance from the CD or DVD 40 to the outside of the CD or DVD player 30, the user will slightly twist the in-dash compact disc retriever 10 such that the hook 50 catches the center aperture 42 of the CD or DVD 40. Once the user is sure that he/she has caught the center aperture 42, he/she pulls the in-dash compact disc retriever 10 out of the CD or DVD player 30 and the CD or DVD 40 that was stuck therein is easily removed from the CD or DVD player 30.

One embodiment of the in-dash compact disc retriever 10 also has a small flashlight or pen light 60 attached to the body 20. The pen light 60 is of the type commonly known to one of ordinary skill in the art and can be attached to the body 20 in any number of ways, including but not limited to, via an adhesive or formed to the body 20 in manufacture as one piece. The pen light 60 allows the user to see inside the CD or DVD player 30 to aid the user in finding the center aperture 42 of the CD or DVD 40. The pen light 60 can be of a size too large to enter the opening for insertion of a CD or DVD 32 and therefore is most preferably located on the body 20 behind the ruler type incremental markings 22 or is attached to the body 20 so that it is moveable, or the pen light 60 can be of a size small enough to enter the opening 32 and therefore is most preferably located on the body 20 close to the hook 50.

Although this invention has certain preferred embodiments, it will be obvious to those skilled in the art that various changes and modifications may be made therein without departing from the invention, and all such changes and modifications are intended to fall within the true spirit and scope of the invention.

What is claimed is:

1. A compact disc retrieving apparatus comprising:
    a flat base for inserting into a compact disc player and a digital video disc player; and
    a soft, pliable hook attached to one end of said flat base.
2. An apparatus according to claim 1 wherein said flat base further has at least one mark thereupon to indicate a predetermined distance from said hook.
3. An apparatus according to claim 1 wherein said flat base further has a series of incremental marks thereupon.
4. An apparatus according to claim 1 wherein said flat base further has a small flashlight coupled therewith.

* * * * *